United States Patent
Cohen et al.

(10) Patent No.: US 7,746,226 B2
(45) Date of Patent: Jun. 29, 2010

(54) SYSTEM AND METHOD FOR PROVIDING DYNAMIC PRESENCE INFORMATION AS COLLECTED BY A MOBILE DEVICE

(75) Inventors: Norman Howard Cohen, Suffern, NY (US); Ruthie D Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 11/694,207

(22) Filed: Mar. 30, 2007

(65) Prior Publication Data

US 2008/0242265 A1 Oct. 2, 2008

(51) Int. Cl.
*G08B 1/08* (2006.01)

(52) U.S. Cl. .............. 340/539.13; 340/3.7; 340/539.23; 455/411

(58) Field of Classification Search ............... 455/411; 726/2, 26–28; 380/270, 258; 340/5.8, 5.2, 340/3.1, 539.11, 539.13, 573.1, 552, 567, 340/3.7, 539.23, 573.4
See application file for complete search history.

(56) References Cited

U.S. PATENT DOCUMENTS

| | | | |
|---|---|---|---|
| 5,731,757 A * | 3/1998 | Layson, Jr. ............. 340/539.13 |
| 6,961,541 B2 | 11/2005 | Overy et al. |
| 2003/0232598 A1 | 12/2003 | Aljadeff et al. |
| 2004/0252837 A1 | 12/2004 | Harvey et al. |
| 2005/0104731 A1 * | 5/2005 | Park ............................ 340/552 |
| 2006/0030263 A1 * | 2/2006 | Seligmann et al. ......... 455/41.2 |
| 2006/0079208 A1 | 4/2006 | Kim et al. |
| 2006/0099965 A1 | 5/2006 | Aaron |
| 2006/0115080 A1 * | 6/2006 | Gabara et al. ................. 380/39 |
| 2006/0206941 A1 | 9/2006 | Collins |

OTHER PUBLICATIONS

Schulzrinne, Gurbani, Kyzivat and Rosenberg, "RPID: Rich Presence Extensions to the Presence Information Data Format (PIDF)," Jul. 2006.
Day, Rosenberg, and Sugano, "A Model for Presence and Instant Messaging," Feb. 2000.

* cited by examiner

*Primary Examiner*—Thomas J Mullen
(74) *Attorney, Agent, or Firm*—Michael J. Buchenhorner; Derek S. Jennings

(57) ABSTRACT

A system and method for detecting proximity of at least one outside party to a multi-party communication includes steps of: receiving presence information of the at least one outside party, wherein the presence information comprises sensor data received from at least one sensor indicating that the outside party is in proximity to a second party; analyzing the sensor data to determine its threat level; and transmitting a signal to the first party, the signal indicating that at least one outside party is in proximity to the second party.

21 Claims, 5 Drawing Sheets

SYSTEM AND METHOD FOR PROVIDING DYNAMIC PRESENCE INFORMATION AS COLLECTED BY A MOBILE DEVICE

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of mobile communication, and particularly relates to ensuring, before such communication takes place, that the communication is likely to be private.

BACKGROUND OF THE INVENTION

Advances in mobile communications and computing have made it possible for people to communicate from almost any kind of milieu, including meeting rooms and public places. This capability brings with it a concern that communications intended to be private will be seen or overheard by outside parties. For this reason, emerging efforts to augment presence services (the services that tell instant-messaging users which other instant-messaging users are currently online and willing to receive instant messages) include ways to specify whether the parties to a would-be communication are in environments appropriate for a private communication. The Internet Engineering Task Force (IETF) proposal RFC 4480 for "RPID: Rich Presence Extensions to the Presence Information Data Format," by H. Schulzrinne, Columbia University, V. Gurbani, Lucent, P. Kyzivat and J. Rosenberg, Cisco, June 2006 envisions presence data including a privacy attribute indicating "whether the communication service is likely to be observable by other parties;" separate values can be specified for audio, video, and text communications. A standardization of a format for representing expected levels of privacy is a step towards securing private communications, but it does not specify how the privacy information is to be collected.

In RFC 2778, "A Model for Presence and Instant Messaging," by M. Day, Lotus, J. Rosenberg, dynamicsoft, and H. Sugano, Fujitsu, February 2000, the IETF defines "presentity" as an entity that "provides presence information to a presence service." The proposed Parlay X presence specification includes a description of presence information: "a set of attributes that characterize the presentity, such as current activity, environment, communication means, and contact addresses." While these efforts address mechanisms for conveying privacy-related presence information, they do not address the problem of how such information is to be gathered. One possible approach is for individuals to manually report their own evaluations of their current environments, but this can be an unwelcome distraction to an individual who is already multitasking, and does not preclude an eavesdropper sneaking up on someone engaged in a conversation. Another approach is to use location information from other users of a service (for example, E911 information from other subscribers to a cellular phone network, Wi-Fi-based location information from other users of a wireless LAN, or location information gathered from badges about their wearers' locations) to determine that those individuals are nearby. However, such an approach detects the presence only of those individuals who are participating in an activity that discloses their locations to the presence infrastructure; it does not address the problem of surreptitious eavesdropping.

Therefore, there is a need for an improved system that provides dynamic presence information, overcoming the shortcomings of the prior art.

SUMMARY OF THE INVENTION

Briefly, a system for informing a first party in a multi-party communication of the proximity of at least one outside party to second party in the multi-party communication includes: at least one sensor for collecting evidence of proximity of the at least one outside party to the second party in the multi-party communication; an analytical mechanism for interpreting the evidence collected by the at least one sensor to provide a signal indicating the proximity of the at least one outside party; and a transmitter for transmitting the signal to the first party. The at least one sensor is operatively connected to a communication device in use by the second party.

A method for detecting proximity of at least one outside party to a multi-party communication includes steps or acts of: receiving presence information of the at least one outside party, wherein the presence information includes sensor data received from at least one sensor indicating that the outside party is in proximity to a second party; analyzing the sensor data; and transmitting a signal to a first party, the signal indicating that the at least one outside party is in proximity to the second party.

The method can also be implemented as a computer program product embodied on a computer readable medium or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
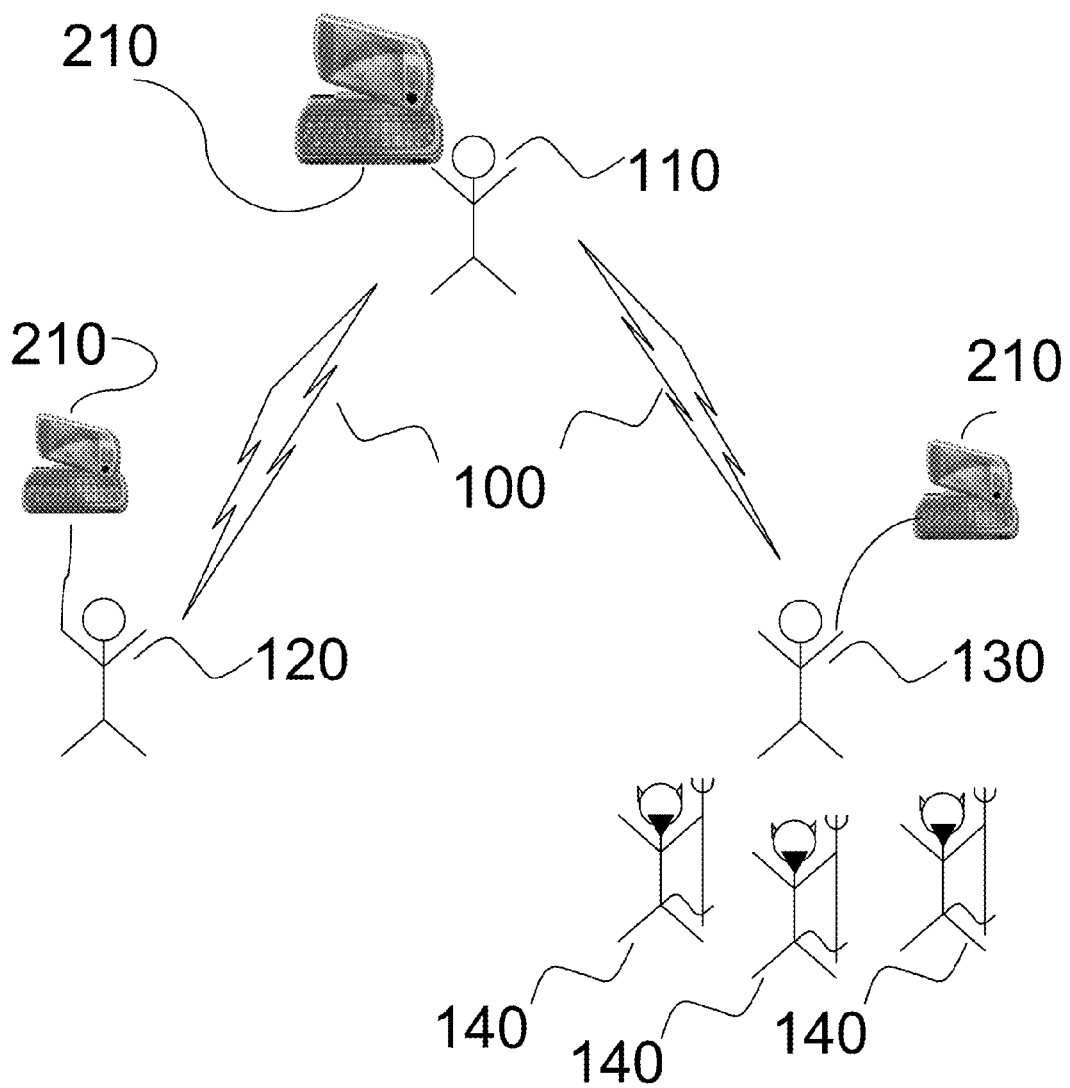
FIG. 1 depicts the context in which a dynamic presence information system operates.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a system and method for gathering dynamic presence information. According to an embodiment of the present invention, a mobile communications device gathers data about its surroundings to automatically determine the presence of potential eavesdroppers. We do not preclude individuals from manually providing information about their surroundings, nor do we preclude the use of information from other peoples' use of services such as cellular phone or wireless LAN networks, or their wearing of badges; but neither do we rely exclusively on such sources of location information.

According to an embodiment of the present invention, we employ sensors as a part of, or an accessory to, the presentity's communication device. These sensors detect characteristics of the physical environment surrounding the presentity (presence information). We define presence as an availability of the presentity for communication purposes. It indicates the communication state of the presentity. For example, presence information might encompass the physical proximity of the presentity to a speaker, or it might deal with non-physical proximity, such as the communication range of the presentity vis-à-vis the speaker. A presentity may be considered "present" for a communication while not actually being in close physical proximity to a speaker. This is because a presentity may employ communication devices which pick up long range transmissions.

A mobile communications device (such as a cell phone, PDA, or laptop computer) includes one or more means for determining the presence or absence of potential eavesdroppers and reporting this information to the potential participants in a communication. These means may include sensors to collect raw information and analytical mechanisms to compare sensor data. The analytical mechanisms may be implemented as computer programs running on processors embedded in either the mobile communications device or the sensors themselves. They compare sensor data to profiles of the sensor data expected when other people are present, or the analytical mechanisms may analyze combinations of data from multiple sensors to deduce the presence or absence of potential eavesdroppers.

The sensors may include, for example, radio-frequency receivers that read active badges or passive RFID tags, or detect the presence of wireless LAN, Bluetooth, or cellular phone transmissions; microwave, infrared, camera, or ultrasound systems to detect the presence, distance, contours, or motion of objects; infrared systems to detect body heat; microphones to detect ambient noise. A sensor may be embedded in the mobile communications device or mounted on a nearby support, such as a wall or a pole, communicating with the mobile communications device by Bluetooth wireless technology or some other means.

The sensors may be supplemented by human input, through some sort of a human-computer interface, conveying an individual's own assessment of his or her surroundings, possibly including the presence, identity, and activities, and threat level of other individuals. This human input may be initiated by the individual supplying it, or supplied in response to a request from another party to the conversation, either before or during the conversation.

Referring to FIG. 1, consider a communication 100 among a first party 110 and one or more second parties 120, 130. Possible forms of the communication include, but are not limited to, electronic mail, cellular telephone, instant message, and audio-video presentation. Before sending sensitive information to a second party 130, the first party 110 may wish to ascertain whether there are potential eavesdroppers 140 who may see, overhear, or intercept the communication to the second party 130, using a mobile communication device 210, such as a PDA.

Figure 2:
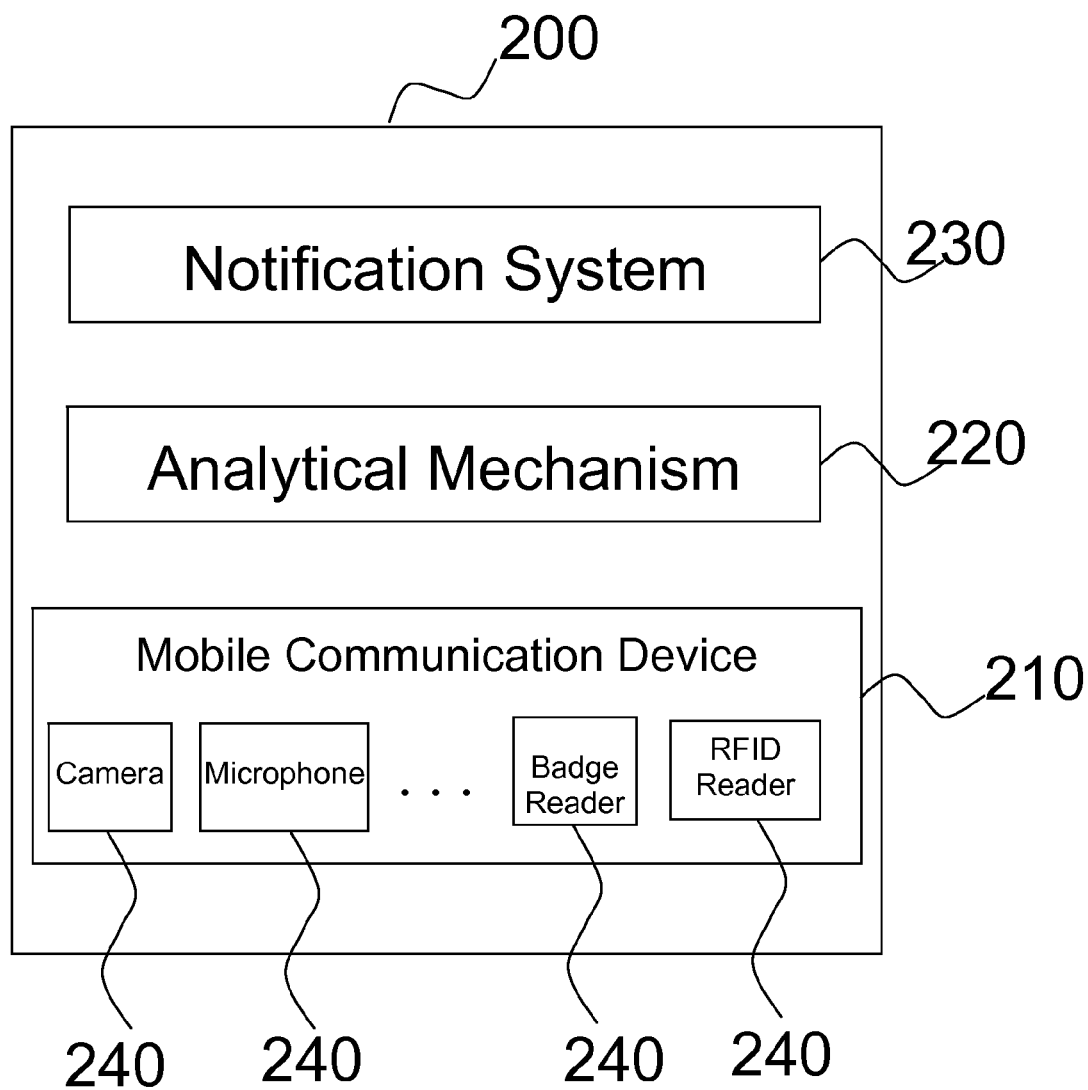
FIG. 2 is a block diagram describing the architecture of a dynamic presence information system.

Referring to FIG. 2, there is shown a system 200 for providing a first party 110 with information about the potential presence of eavesdroppers at the location of the second party 130. This information may consist of a simple alert such as a tone signal or flashing light-emitting diode (LED) indicating the possible presence of a third party. The alert may include a numeric indicator of the likelihood that a third party is present. For example, a value of 0.0 may be used to indicate that a third party is definitely not present, 0.5 to indicate that a third party is equally likely to be present or not, 1.0 to indicate that a third party is definitely present, and values such as 0.25 and 0.75 to indicate intermediate levels of confidence that a third party is present. This numeric indicator might be delivered to a monitoring system operated by the first party 110, such as a computer system running monitoring software, or it might be displayed directly to the first party 110 on the mobile communication device 210, perhaps depicted by a graphical indicator such as a bar graph, similar to the bar graph shown on cellular phones indicating signal strength.

The alert may optionally contain descriptive information about the apparent third parties, such as whether the outside party appears to belong to a class of people from whom the communication 100 should remain private, or a numeric indication of the likelihood that a third party 140 is a potential eavesdropper.

The system 200 comprises a mobile communication device 210 with sensors 240, an analytical mechanism 220, and a notification system 230. The mobile communication device 210 is carried and used by the second party 130. Optionally, both parties may carry the mobile communication device 210. Possible forms of the mobile communication device 210 include, but are not limited to, a pager, a notebook computer, a cellular phone, a personal digital assistant, and a converged device that performs multiple functions, such as those of a cellular phone, personal digital assistant, and digital camera.

The analytical mechanism 220 interprets data from the sensors 240 and deduces the likely proximity of potential eavesdroppers (outside parties). The analytical mechanism 220 may comprise any information processing hardware (including but not limited to computing devices), software, or a combination of hardware and software. It may be located entirely on the mobile communication device 210, it may be distributed over the mobile communication device 210 and one or more other platforms, or it may be distributed over one or more platforms that do not include the mobile communication device 210. These other platforms may be computing devices connected through a computer network such as the Internet. The analytical mechanism 220 compares sensor data with profiles of sensor data expected when one or more outside parties is in proximity.

The analytical mechanism 220 may be a computer processor executing analytical software in which the analytical mechanism 220 interprets combinations of data from multiple sensors. Moreover, one or more functions of the analytical mechanism 220 can be performed in one or more of the sensors 240. The notification system 230 is responsible for informing the first party 110 of the likely presence of potential eavesdroppers in the vicinity of the second party 130, and preferably includes a transmitter and receiver for enabling radio frequency communication.

Examples of the sensors 240 comprise radio-frequency receivers, microwave sensors, infrared sensors, cameras, ultrasound sensors, microphones, and human-input devices. In an application—such as one restricted to a secured building, all of whose occupants are required to wear an identification badge—the radio-frequency receiver may be an RFID-tag (radio-frequency identification-tag) reader for an RFID tag embedded in the badge, or an active-badge reader for a radio-frequency transmitter embedded in the badge. Similarly, a radio-frequency receiver could be used to detect the presence (but not necessarily the content) of transmissions to or from other portable communication devices in the proximity. These transmissions can include, for example, IEEE 802.11a, 802.11b, 802.11g, and 802.11n Wireless Local Area Network transmissions; Bluetooth or Zigbee transmissions; or cellular phone transmissions. An example of a microwave sensor is a radar sensor.

Either a radar sensor, an infrared sensor, or an ultrasound sensor may be capable of detecting the presence, distance, or motion of a person or other object, or some combination of these properties. In addition, a radar sensor, an infrared sensor, or an ultrasound sensor may be capable of detecting the contours of a person or other object, while a camera would be capable of detecting its appearance from a particular perspective.

Various sensors 240 may be most effective when situated in a particular way, for example above the heads of people in a crowd, or at some distance from the second party 130 or the mobile communication device 210 of the second party 130. Therefore, the present invention anticipates that one or more of the sensors 240 may be detached or detachable from the communication device 210. In a preferred embodiment, detached sensors would communicate with the mobile communication device 210 wirelessly, for example using Bluetooth or Zigbee. Detached or detachable sensors may be accompanied by adhesive tape, hooks, telescoping poles, or telescoping tripods to facilitate their effective placement.

Of course second parties 130 may themselves become aware of nearby third parties 140, either on their own or after being alerted by the system 200 to suspicious sensor readings. Therefore, the sensors 240 may also include a conventional human-input device through which second parties 130 could directly communicate their awareness of nearby third parties 140. Examples of such devices comprise buttons, keyboards, microphones for sensing a second party's spoken input, and cameras for sensing a second party's gestures or lip movements. The input provided by the second party 130 may include supplementary information about the third parties 140.

Examples of such supplementary information comprise whether or not a particular outside party is known to the second party 130 (and if so, the identity of that outside party), the apparent organizational affiliations of the outside party, the distance of the outside party from the second party 130, the current activities of the outside party, and whether the outside party appears to be paying attention to the second party's communications.

The first party's request for information may specify the particular types of supplementary information that the first party 110 desires. The system supports a protocol in which a first party 110, desiring to communicate sensitive information, asks one or more second parties 120 to observe and evaluate their current levels of privacy, and to use their human-input devices to provide information of the kind just described. The supplementary information may include the level of threat posed by one or more outside parties to privacy of communication, based on such attributes such as, but not limited to, whether an outside party is known to the second party, the organizational affiliations of an outside party, the proximity of an outside party, the current activities of an outside party, and whether an outside party appears to be paying attention to the communication between the first party and the second party 120.

Figure 3:
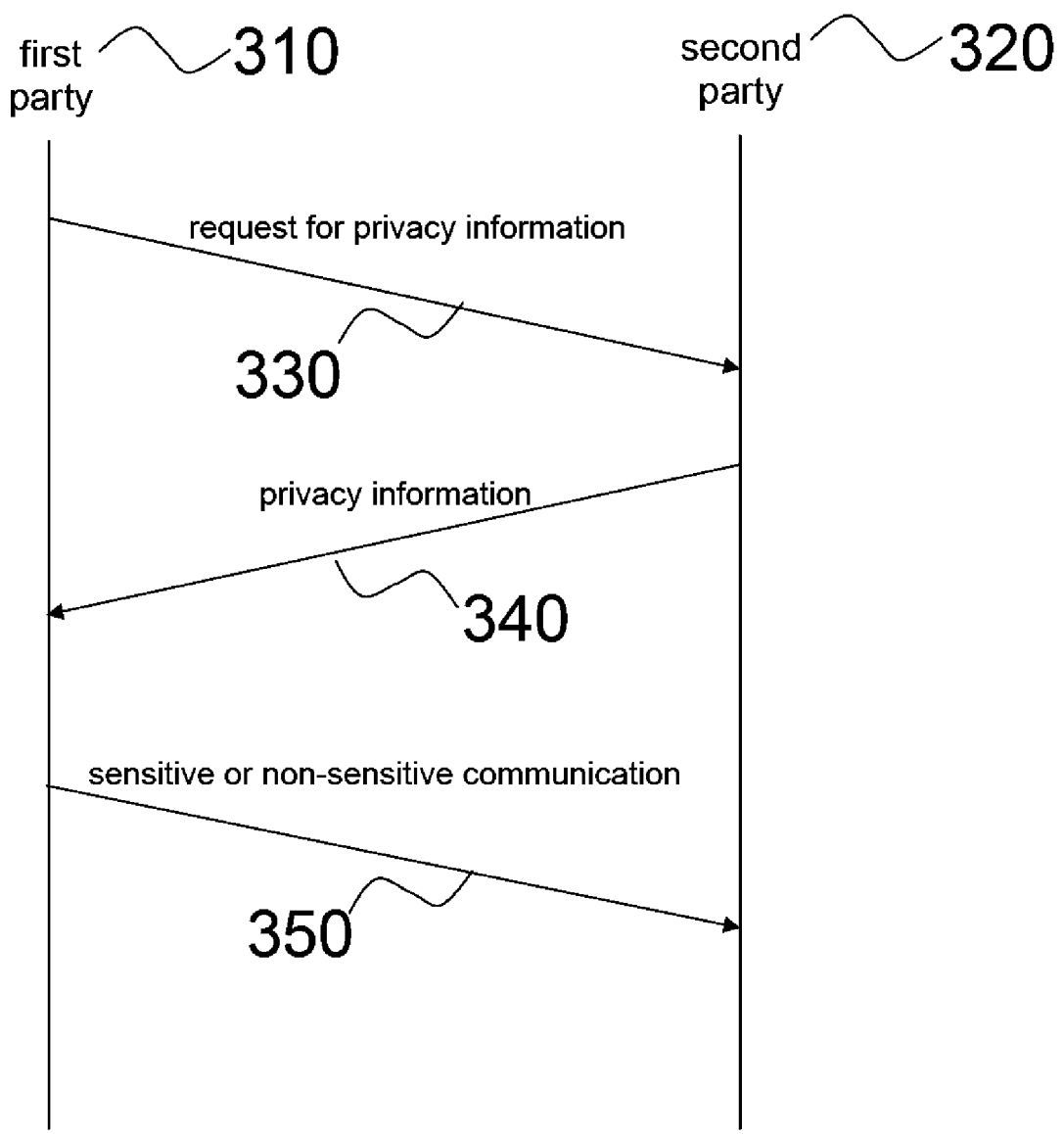
FIG. 3 is a sequence diagram depicting a protocol in which a first party requests privacy information, and a second party responds to this request, before communications between the first party and the second party commence.

In one variation, depicted in FIG. 3, the system may require this exchange to take place at the beginning of a communication, before any substantive information is exchanged: The first party 310 sends the second party 320 a request 330 for information about how private the communication is likely to be, and the second party 320 responds with this information 340, after which the first party 310 is permitted to send sensitive or non-sensitive information 350 to the second party 320.

Figure 4:
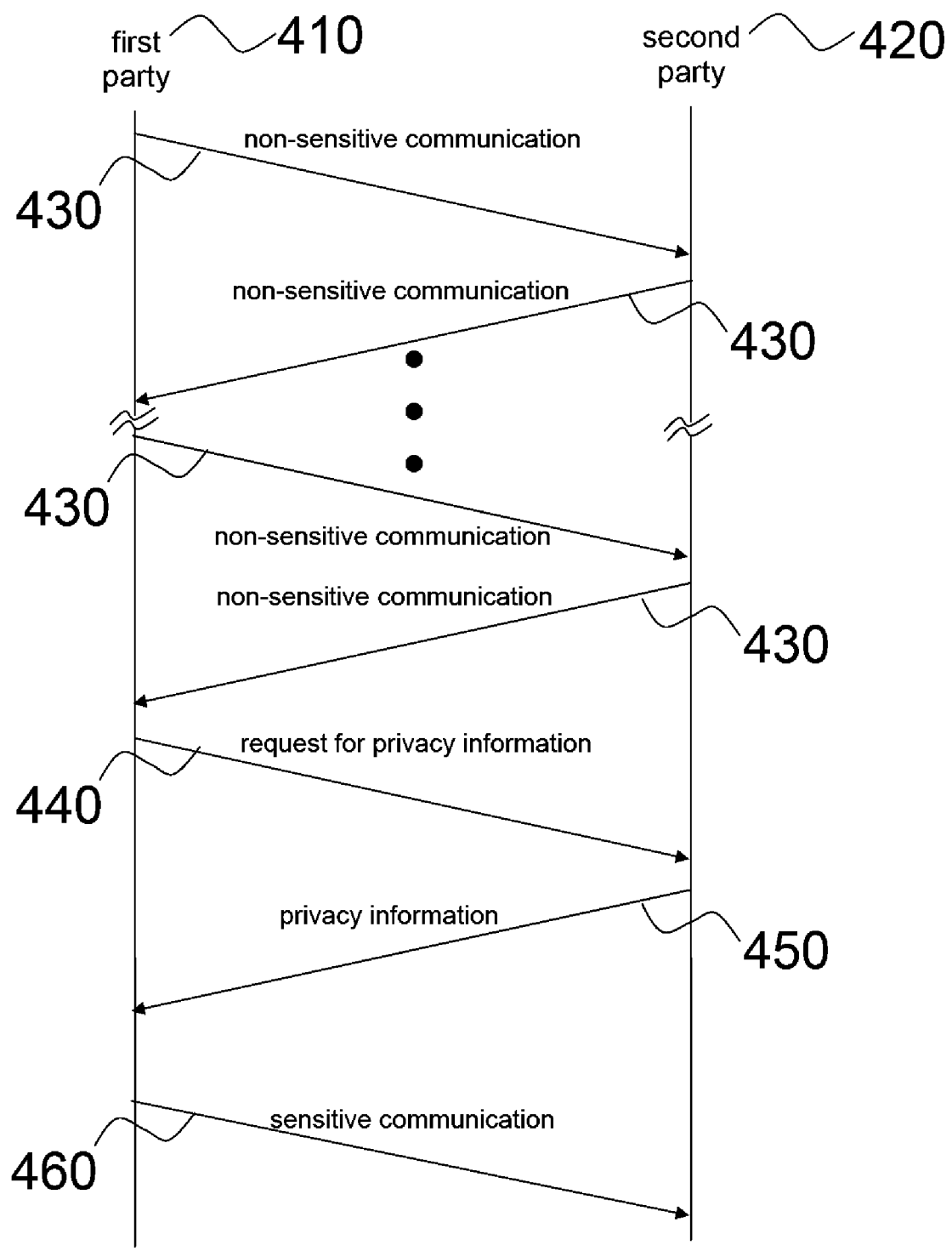
FIG. 4 is a sequence diagram depicting a protocol in which a first party requests privacy information, and a second party responds to this request, after communications between the first party and the second party have commenced, but before any sensitive information is communicated to the second party.

In another variation, depicted in FIG. 4, this exchange may take place in the middle of a communication in which non-sensitive substantive information 430 has already been exchanged: At some point, desiring to transmit sensitive information, the first party 410 sends the second party 420 a request 440 for information about how private the communication is likely to be, and the second party 420 responds with this information 450, after which the first party 410 is permitted to send sensitive information 460 to the second party 420. In either case, the system may automate or facilitate the first party's request for information from the second party, the second party's response, or both.

The analytical mechanism 220 uses raw data from the sensors 240 to deduce the likely presence and nature of third parties. The analytical mechanism 220 may interpret combinations of data from multiple sources, for example to reach more reliable conclusions about the likely presence of an outside party or to reach more reliable conclusions about the degree of threat to privacy of communications posed by a particular outside party. The analytical mechanism 220 may compare sensor data with profiles of data expected when an outside party is present. The analytical mechanism 220 may include low-level components within the sensors 240 themselves, medium-level mechanisms within the mobile communication device 210, high-level mechanisms elsewhere within the overall presence-information system 200 (perhaps on a computing device accessed over a network), or some combination of these. The analytical mechanism 220 compares sensor data with profiles of sensor data expected when one or more outside parties is present.

A low-level component may detect motion from raw infrared readings or distances from raw radar returns, for example. A medium-level component may identify objects within images, or distinguish radio-frequency transmissions emanating from the second party's own mobile communication device 210 and from local wireless-network infrastructure from transmissions emanating from outside parties, for example. A high-level component may perform database lookups, voice recognition, or face recognition, for example. Of course other distributions of analytical functions over the components of the analytical mechanism 220 are also possible.

Examples of a notification system 230 include text messages, instant messages, e-mail, telephonic communications (perhaps using synthesized speech), graphical user interfaces, or a unified messaging system that delivers notifications to the first party in a manner that depends on the current milieu and activities of the first party.

Figure 5:
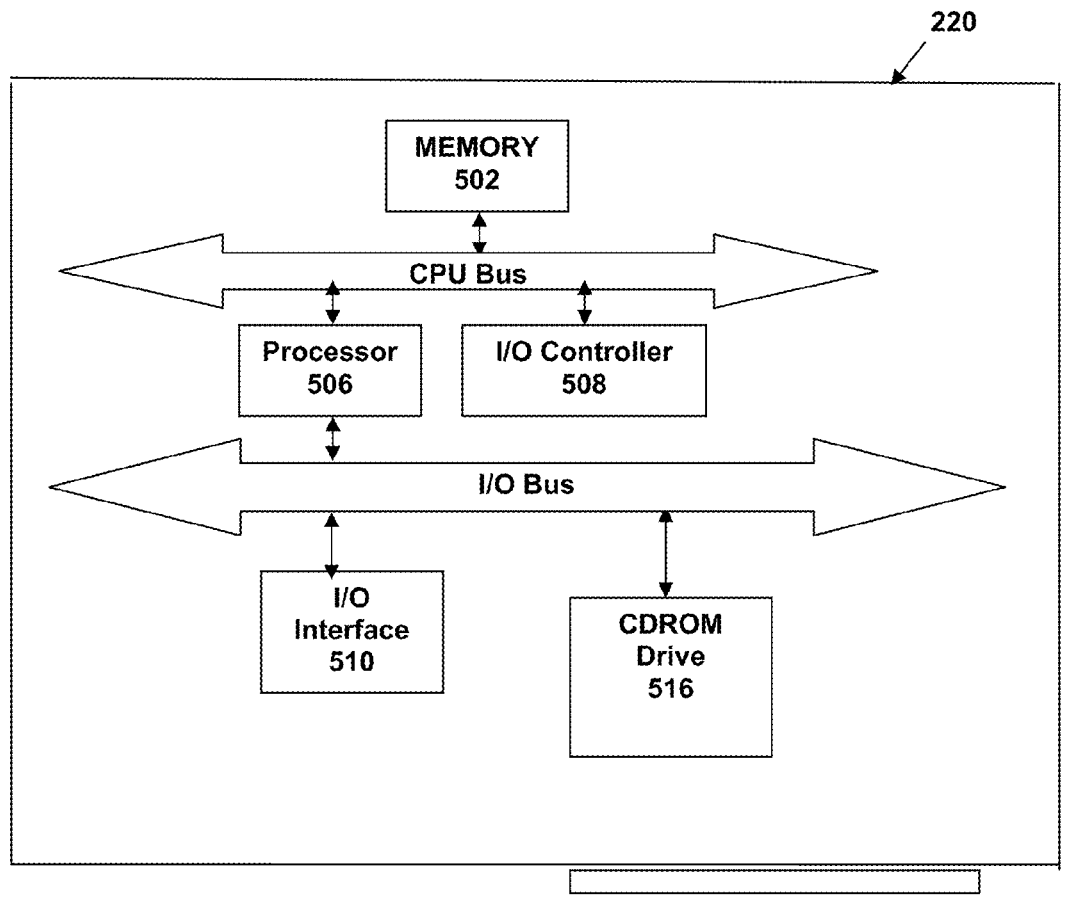
FIG. 5 is a simplified block diagram of the analytical mechanism, according to an embodiment of the present invention.
Figure 5:
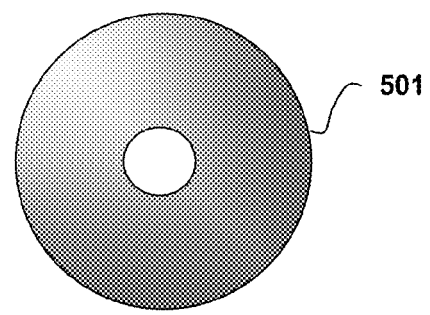

Referring to FIG. 5, there is shown a simplified block diagram of the analytical mechanism 220 configured to operate according to one embodiment of the present invention. As shown, the analytical mechanism 220 may be an information handling system consistent with an embodiment of the present invention. For purposes of this invention, information handling system 220 may represent any type of computer, information processing system or other programmable electronic device, including a client computer, a server computer, a portable computer, an embedded controller, a personal digital assistant, and so on. The information handling system 220 may be a stand-alone device or networked into a larger system.

The system 220 could include a number of operators and peripheral devices as shown, including a processor 506, a memory 502, and an input/output (I/O) subsystem 508. The processor 506 may be a general or special purpose microprocessor operating under control of computer program instructions executed from a memory. The processor may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips. The memory may be partitioned or otherwise mapped to reflect the boundaries of the various memory subcomponents.

The memory 502 represents either a random-access memory or mass storage. It can be volatile or non-volatile. The system 220 can also comprise a magnetic media mass storage device such as a hard disk drive.

The I/O subsystem 508 may comprise various end user interfaces 510 such as a display, a keyboard, and a mouse. The I/O subsystem 508 may further comprise a connection to a network such as a local-area network (LAN) or wide-area network (WAN) such as the Internet. Processor and memory components are physically interconnected using conventional bus architecture. The system 220 may also include at least one sensor for detecting proximity of an outside party.

According to another embodiment of the invention, a computer readable medium, such as a CDROM 501 can include program instructions for operating the programmable computer 220 according to the invention. A CDROM drive 516 may be removable or fixed to the information handling system 220. What has been shown and discussed is a highly-simplified depiction of a programmable computer apparatus. Those skilled in the art will appreciate that other low-level components and connections are required in any practical application of a computer apparatus.

The presence detection method as described above may be further optimized for providing it as a fee-based service for users. A user of the service may subscribe monthly or pay for the service on a per-use basis. The service may be an add-on, purchased at the time a user purchases a mobile communication device.

What has been shown and discussed is a highly-simplified depiction of a dynamic presence detection system, according to an embodiment of the present invention. Those skilled in the art will appreciate that a variety of alternatives are possible for the individual elements, and their arrangement, described above, while still falling within the scope of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A system for informing a first party in a multi-party communication of the proximity of at least one outside party to a second party in the multi-party communication, the system comprising:
    at least one sensor configured for collecting evidence of the proximity of the at least one outside party to the second party in the multi-party communication;
    an analytical mechanism configured for interpreting the evidence collected by the at least one sensor to provide a signal indicating the proximity of the at least one outside party to the second party; and
    a transmitter configured for transmitting the signal to a communication device in use by the first party in the multi-party communication.

2. The system of claim 1 wherein the at least one sensor is operatively connected to, or embedded in, a communication device in use by the second party.

3. The system of claim 1 wherein one or more components of the analytical mechanism are operatively connected to, or embedded in, a communication device in use by the second party.

4. The system of claim 1 in which the at least one sensor comprises at least one of the following:
    at least one radio-frequency receiver configured for receiving radio frequency transmissions, comprising at least one selected from a group consisting of:
    a radio-frequency receiver that is part of an active-badge reader;
    a radio-frequency receiver that is part of a passive RFID-tag reader; and
    a radio-frequency receiver that detects the presence of transmissions other than those originating from the communication device or one or more of the sensors; and
    wherein the at least one sensor further comprises:
    a microwave-based sensor configured for detecting one or more of the presence, distance, contours, and motion of objects;
    an infrared sensor configured for detecting body heat;
    an infrared sensor configured for detecting one or more of the presence, distance, contours, and motion of animate objects;
    a camera configured for detecting one or more of the presence, distance, appearance, and motion of objects;
    an ultrasound sensor configured for detecting one or more of the presence, distance, contours, and motion of objects;
    a microphone configured for detecting ambient sound; and
    a human-input device through which the second party communicates an indication of the presence of one or more outside parties.

5. The system of claim 4 in which the at least one radio-frequency receiver comprises an RFID reader.

6. The system of claim 4 in which the at least one radio-frequency receiver detects the presence of transmissions other than those originating from the second party communications device or the at least one sensor.

7. The system of claim 1 wherein an indication of the proximity the at least one outside party comprises supplementary information supplied by the second party.

8. The system of claim 7 wherein the supplementary information includes the apparent identity of the at least one outside party.

9. The system of claim 7 in which the supplementary information includes the level of threat posed by one or more outside parties to privacy of communication, based on attributes comprising at least one selected from a group consisting of: whether an outside party is known to the second party, the organizational affiliations of an outside party, the proximity of an outside party, the current activities of an outside party, and whether an outside party appears to be paying attention to the communication between the first party and the second party.

10. The system of claim 7 wherein the supplementary information includes an indication of the likelihood of the presence of the at least one outside party.

11. The system of claim 1 in which one or more of the sensors is mounted on a supporting apparatus near the mobile communication device and communicates with said mobile communication device through a means of wireless communication comprising Bluetooth or Zigbee.

12. The system of claim 1 in which the analytical mechanism is a computer processor executing analytical software.

13. A method for detecting proximity of at least one outside party to a multi-party communication between a first party and a second party, the method comprising steps of:
receiving presence information of the at least one outside party, wherein the presence information comprises sensor data received from at least one sensor indicating that the outside party is in proximity to the second party;
analyzing the sensor data to determine if the proximity of the outside party to the second party constitutes a threat to privacy of the multi-party communication;
determining a level of the threat to privacy of the multi-party communication; and
transmitting a signal to a first party, the signal indicating that the at least one outside party is in proximity to the second party and providing the threat level.

14. The method of claim 13 further comprising a step of:
comparing the analyzed sensor data with profiles of sensor data expected when the at least one outside party is in communication range.

15. The method of claim 13 wherein the step of analyzing the sensor data comprises a step of: interpreting combinations of data from multiple sensors.

16. The method of claim 13 wherein the transmitting step further comprises steps of:
providing sensor readings to the second party that indicate a heightened probability of the presence of the at least one outside party; and
receiving from the second party supplementary information in response to the sensor readings.

17. The method of claim 13 further comprising a step:
transmitting a request for privacy information from a first party to the second party in order to prompt the second party to indicate the presence of the at least one outside party.

18. The method of claim 17 in which the request specifies a type of privacy information to be provided.

19. The method of claim 18 in which the request by the first party and the response to that request by the second party take place before any other communication between the first party and the second party.

20. The method of claim 18 in which the request by the first party and the response to that request by the second party take place at any point during the communication between the first party and the second party.

21. A computer program product embodied on a computer readable medium and comprising code that, when executed, causes a computer to perform the following:
receive presence information of an at least one outside party in a multi-party communication between a first party and a second party, wherein the presence information comprises sensor data received from at least one sensor indicating that the at least one outside party is in proximity to the second party;
analyze the sensor data to determine if the proximity of the at least one outside party to the second party constitutes a threat to privacy of the multi-party communication;
determining a level of the threat to privacy of the multi-party communication; and
transmit a signal to the first party, the signal indicating that the at least one outside party is in proximity to the second party and providing the threat level.

* * * * *